(No Model.)

T. O. MORTON.
PAN.

No. 411,996. Patented Oct. 1, 1889.

WITNESSES:
John M. Deemer
C. Sedgwick

INVENTOR:
T. O. Morton
BY Munn & Co.
ATTORNEYS.

UNITED STATES PATENT OFFICE.

THOMAS O. MORTON, OF BROOKLYN, ASSIGNOR OF ONE-HALF TO WILLIS B. BLACKWELL, OF NEW YORK, N. Y.

PAN.

SPECIFICATION forming part of Letters Patent No. 411,996, dated October 1, 1889.

Application filed December 7, 1888. Serial No. 292,913. (No model.)

*To all whom it may concern:*

Be it known that I, THOMAS O. MORTON, of Brooklyn, in the county of Kings and State of New York, have invented a new and Improved Pan, of which the following is a full, clear, and exact description.

Reference is to be had to the accompanying drawings, forming a part of this specification, in which similar letters of reference indicate corresponding parts in all the figures.

Figure 1:
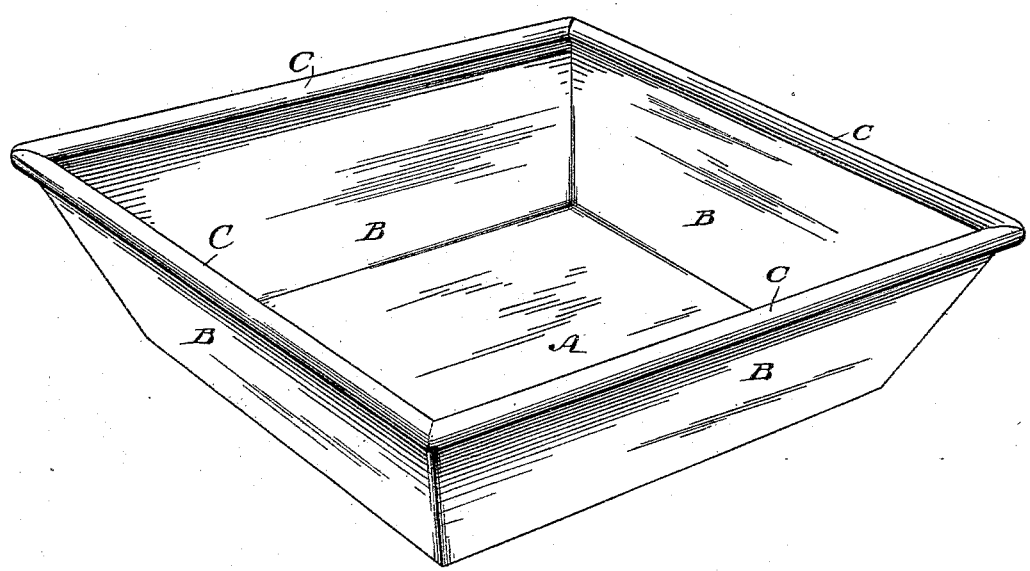
Figure 2:
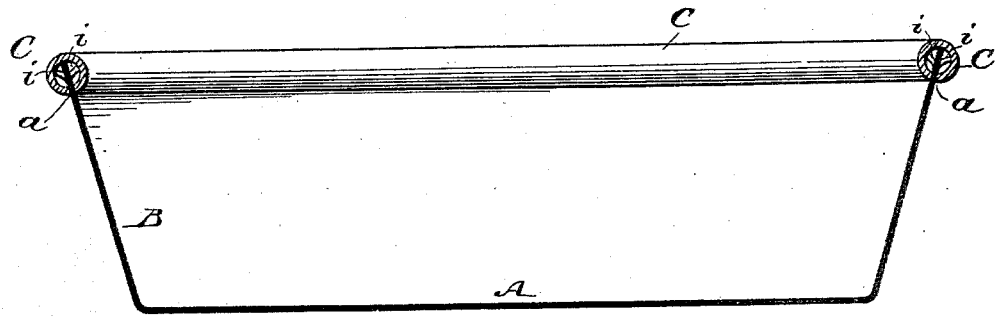
Figure 3:
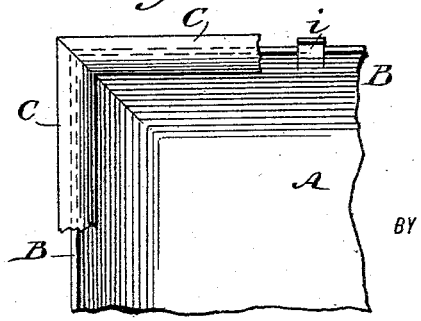

Figure 1 is a perspective view of my new and improved pan. Fig. 2 is a sectional elevation of the same, and Fig. 3 is a detailed plan view of one corner of the pan.

My invention consists of a pan the upper edges of which are stiffened and ornamented by a bead composed of a tube, preferably of brass, slotted and applied to the edges, the ends of the tubes being mitered or otherwise connected together to form the proper finish, the tubes being held by lips or fastening devices at the edge of the pan, all as hereinafter described and claimed.

A represents the bottom, and B B the side walls, of the pan. To the upper edge of each of the side walls is applied a tube C, of polished brass or other metal. These tubes are each slotted through longitudinally, as shown at $a$, to receive the edge of the side walls, as shown clearly in Fig. 2. The ends of the tubes are mitered together, as shown in Figs. 1 and 3, to form a perfect finish. The upper edges of the pan are slotted to form projections or tongues $i\ i$, which are bent outward to form fastening-pieces, as indicated in Fig. 2, for holding the tubes upon the pan.

By making the pan as described the upper edges thereof are strengthened and protected by the tubes C, and the whole body of the pan is stiffened and made more firm by the tubes, and the tubes render the pan very ornamental, and they serve also as good handles for lifting the pan.

Having thus fully described my invention, I claim as new and desire to secure by Letters Patent—

The pan B, having the fastening-pieces $i$ at the upper edge, in combination with the slotted tube C, applied to the upper edge of the pan, substantially as shown and described.

THOMAS O. MORTON.

Witnesses:
H. A. WEST,
C. SEDGWICK.